Jan. 8, 1924.
H. L. SPENCE ET AL
1,480,026
TRANSITIONAL COUPLING MECHANISM
Filed Feb. 8, 1922
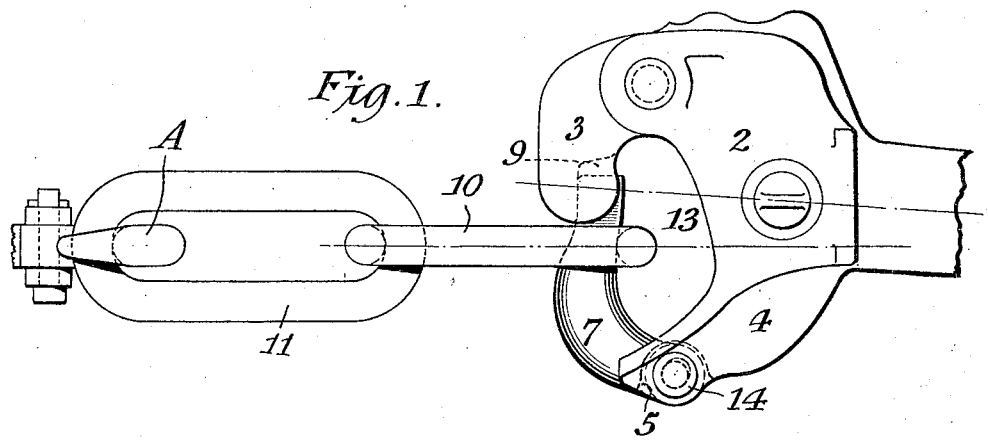
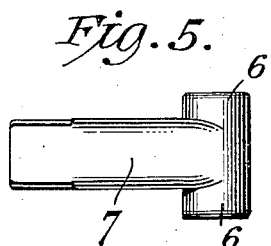
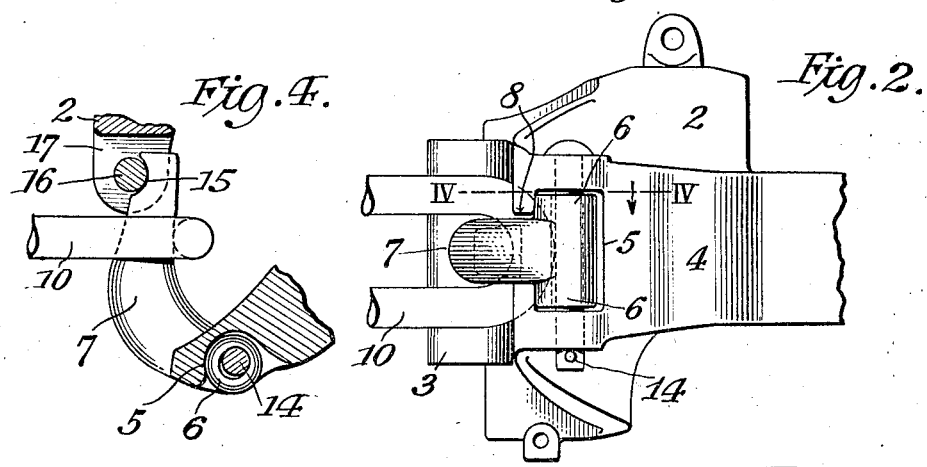
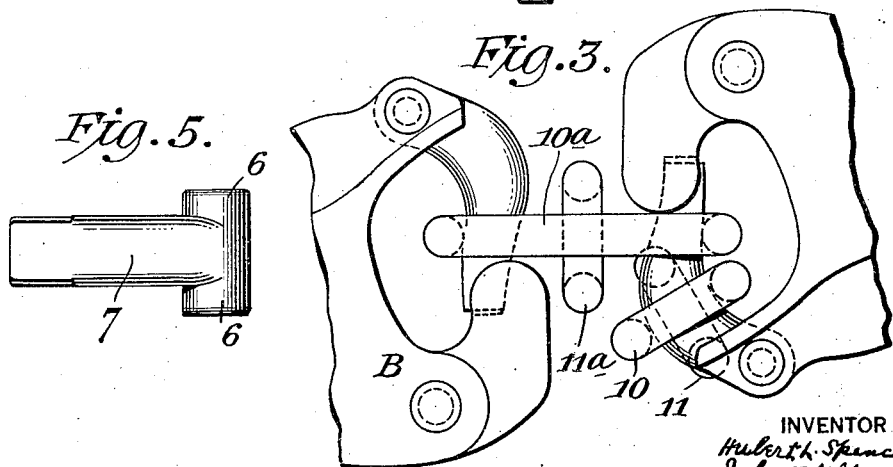
INVENTOR
Hubert L. Spence and
John Willison
BY
Clarence D Kerr
ATTORNEY Patented Jan. 8, 1924.

1,480,026

UNITED STATES PATENT OFFICE.

HUBERT L. SPENCE AND JOHN WILLISON, OF CLEVELAND, OHIO, ASSIGNORS TO THE NATIONAL MALLEABLE CASTINGS COMPANY, OF CLEVELAND, OHIO, A CORPORATION OF OHIO.

TRANSITIONAL COUPLING MECHANISM.

Application filed February 8, 1922. Serial No. 534,880.

*To all whom it may concern:*

Be it known that we, HUBERT L. SPENCE and JOHN WILLISON, a citizen of the United States, and a subject of the King of Great Britain, respectively, and residents of Cleveland, Cuyahoga County, Ohio, have jointly invented new and useful Improvements in Transitional Coupling Mechanism, of which the following is a specification, reference being had to the accompanying drawings, in which—

Fig. 1 is a plan of a pair of unlike couplers coupled together by our improved transitional mechanism; Fig. 2 is a partial side elevation thereof; Fig. 3 is a plan of a pair of like couplers coupled together by our improved mechanism; Fig. 4 is a section on lines IV—IV of Fig. 2 and also showing the use of the invention with a slotted knuckle; and Fig. 5 is a detail of the transition member.

Our invention relates particularly to transitional coupling mechanism and is designed to provide means for permitting automatic car couplers of the American Master Car Builders' type to be coupled with cars equipped with couplers of other types, such as a draw hook connection. To this end we have provided a transitional or supplemental coupling device which can be readily attached to or detached from the automatic coupler, or otherwise brought into and out of operative position, so that the coupler may be ready for coupling with an automatic coupler of the same type, or with the draw hook arrangement, or any other form of car coupler. Our invention also consists in the various features which we shall hereinafter describe and claim.

Referring to the drawings, the numeral 2 indicates a coupler head of the Master Car Builders' type having a pivoted knuckle 3 and a guard arm 4. The coupler illustrated in the drawing is operated in the usual manner, and when used for coupling direct with an automatic coupler forms no part of our invention. The outer side of the guard arm has a pivot bearing 5 for the trunnions 6 of a transitional member 7, which, when in operative position, extends through a horizontal slot 8 in the forward end of the guard arm, and its outer end engages a recess 9 on the inner face of the nose of the knuckle, thus bridging the opening between knuckle 3 and guard arm 4, and provides a firm bearing upon these parts in pulling.

For the purpose of coupling with a coupler of the same or a different type, a link 10 is carried on the transition member supporting a free link 11, by which it may be connected with a coupler of the draw hook type such as the coupler A, as is shown in Fig. 1.

As the cars upon which these couplers are intended to be used are normally equipped with buffers which maintain the cars a predetermined distance apart, it is sometimes necessary to use the transitional device even though the cars have couplers of the same type thereon, for the reason that the buffers prevent the couplers from coming near enough to each other for automatic coupling. In such case the links on one of the transitional devices are used, such as the links 10$^a$ and 11$^a$, while the links on the other transitional device remain in the depending and unused position of the links 10 and 11, as is shown in Fig. 3.

When the coupler is used as an automatic coupling with another coupler of the American Master Car Builders' type, the transitional device 7, with the links 10 and 11, is swung to the rear behind the guard arm 4, in which position it is out of the way and will not interfere with the coupling operations.

When it is desired to employ the transitional device to connect the coupler with a coupler of the same or a different type, the knuckle 3 is moved to open position and the transitional device 7 is swung forwardly through the slot 8 in the guard arm 4. The link 10$^a$, which is supported from the opposing coupler B, may then be slipped over the free end of the transitional member 7, and the knuckle is then brought into closed or locked position, in which position the transitional member seats in the recess 9 in the knuckle, as is also shown in Fig. 3. With the parts in these positions the coupling has been effected.

The recess on notch 9 in the knuckle is for the twofold purpose of permitting the transitional member to swing forwardly to such an extent that the point of contact between link 10 or 10$^a$ and the transitional member is so far forward that the link can buff back into the coupler cavity 13 to such an extent that it will be relieved of most of the buffing stresses, and also of relieving the pivot pin 14 of the transitional member as well as the outer end of the transitional member of stresses caused by the opposing coupler when pulling from a point above or below the horizontal. The holes through the trunnions 6 of the transition member 7, which are for the reception of the pivot pin 14 by which the transition member is secured to the guard arm, are elongated, so that in pulling the stresses will be taken up by the bearings 5 where the trunnions engage the coupler head, so that the pivot pin 14 is thereby relieved from pulling strains. The elongated pin holes or openings in the trunnions are best shown in Fig. 4.

In Fig. 4 we have shown the knuckle as of the slotted type in which the free end of the transition member 7 has a shallow recess 15 to give a firm bearing on the pin 16 in the slot 17 of the knuckle when the knuckle is in locked position.

The terms and expressions which we have employed are used as terms of description and not of limitation, and we have no intention, in the use of such terms and expressions, of excluding any mechanical equivalents of the features shown and described, or portions thereof, but recognize that various structural modifications are possible within the scope of the invention claimed.

What we claim is:

1. In coupler mechanism, the combination with an automatic coupler having a pivoted knuckle, of a supplemental coupling member pivoted to the guard arm of the coupler head and adapted to be swung to the rear of the guard arm when in inoperative position, and having a bearing in a transversely-extending recess within the nose of the knuckle when in operative position, said supplemental member carring a link for coupling with a coupler of the same or a different type.

2. A car coupler having two forwardly diverging jaws, a pivoted member attached to each jaw, one of the pivoted members having on its inner face a notched transversely-extending bearing for the other member and means for holding the two members in engaged position, and a link mounted on one of such members for coupling with another coupler.

3. A car coupler of the Master Car Builders' type having a knuckle of known character on its pivot pin side, and a transitional member pivoted to its guard arm, the transitional member being held in operative position by engagement within a horizontally disposed recess in the nose of the knuckle and carrying a link for coupling with another coupler.

HUBERT L. SPENCE.
JOHN WILLISON.